(12) United States Patent
Zhu et al.

(10) Patent No.: US 10,470,105 B2
(45) Date of Patent: Nov. 5, 2019

(54) NETWORK STATUS INFORMATION TRANSFER METHOD AND NETWORK DEVICE

(71) Applicant: HUAWEI TECHNOLOGIES CO., LTD., Shenzhen, Guangdong (CN)

(72) Inventors: Hualin Zhu, Shanghai (CN); Youyang Yu, Shanghai (CN); Huan Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/835,008

(22) Filed: Dec. 7, 2017

(65) Prior Publication Data

US 2018/0098267 A1    Apr. 5, 2018

Related U.S. Application Data

(63) Continuation of application No. PCT/CN2015/081995, filed on Jun. 19, 2015.

(51) Int. Cl.
*H04W 48/12* (2009.01)
*H04W 48/08* (2009.01)
(Continued)

(52) U.S. Cl.
CPC ....... *H04W 48/12* (2013.01); *H04W 28/0289* (2013.01); *H04W 48/06* (2013.01);
(Continued)

(58) Field of Classification Search
CPC .. H04W 48/12; H04W 48/14; H04W 28/0289
See application file for complete search history.

(56) References Cited

U.S. PATENT DOCUMENTS

2012/0003958 A1*  1/2012  Hossain ............... H04L 63/101
                                                           455/411
2014/0086177 A1*  3/2014  Adjakple ............. H04W 12/08
                                                           370/329
(Continued)

FOREIGN PATENT DOCUMENTS

CN        101808363 A       8/2010
CN        103686939 A       3/2014
(Continued)

OTHER PUBLICATIONS

3GPP TS 23.402 V132.0 (Jun. 2015),3rd Generation Partnership Project;Technical Specification Group Services and System Aspects;Architecture enhancements for non-3GPP accesses(Release 13),total 292 pages.

(Continued)

*Primary Examiner* — Brian D Nguyen
*Assistant Examiner* — Deepa Belur
(74) *Attorney, Agent, or Firm* — Fish & Richardson P.C.

(57) ABSTRACT

The present disclosure describes a network status information transfer method. In one example method, a first message, transmitted by a third-party server to a user equipment (UE), is received by the UE. The first message comprises an identifier, associated with a trusted wireless local area networks (WLAN) network (TWAN), and first indication information indicating that a packet data network gateway (PGW) is overloaded. If the UE has added the identifier associated with the TWAN to a blacklist, the identifier associated with the TWAN is deleted, by the UE, from the blacklist in response to receiving the first message.

12 Claims, 9 Drawing Sheets

(51) Int. Cl.
*H04W 76/36* (2018.01)
*H04W 28/02* (2009.01)
*H04W 48/06* (2009.01)
*H04W 48/16* (2009.01)

(52) U.S. Cl.
CPC .......... *H04W 48/08* (2013.01); *H04W 76/36* (2018.02); *H04W 48/16* (2013.01)

(56) References Cited

U.S. PATENT DOCUMENTS

| | | | |
|---|---|---|---|
| 2014/0153546 A1 | 6/2014 | Kim et al. | |
| 2014/0241333 A1 | 8/2014 | Kim et al. | |
| 2015/0009824 A1* | 1/2015 | Jeong | H04W 48/14 370/235 |
| 2015/0036492 A1 | 2/2015 | Jin et al. | |
| 2016/0127969 A1* | 5/2016 | Pao | H04W 48/20 455/437 |
| 2016/0134464 A1* | 5/2016 | Centonza | H04W 28/0247 370/236 |
| 2016/0309385 A1 | 10/2016 | Zhang et al. | |
| 2016/0337904 A1* | 11/2016 | Hsu | H04W 28/12 |
| 2017/0006053 A1* | 1/2017 | Greenberg | H04L 63/1425 |
| 2017/0019750 A1* | 1/2017 | Palanisamy | H04W 28/0289 |
| 2017/0078956 A1* | 3/2017 | LeBlanc | H04W 48/18 |
| 2017/0195822 A1* | 7/2017 | Watfa | H04W 4/08 |
| 2017/0201456 A1* | 7/2017 | Siow | H04L 47/125 |
| 2018/0124590 A1* | 5/2018 | O'Connell | H04W 8/02 |

FOREIGN PATENT DOCUMENTS

| | | |
|---|---|---|
| CN | 103747486 A | 4/2014 |
| CN | 104349465 A | 2/2015 |
| EP | 2991291 A1 | 3/2016 |
| WO | 2014183253 A1 | 11/2014 |
| WO | 2015048992 A1 | 4/2015 |

OTHER PUBLICATIONS

International Search Report in International Application No. PCT/CN2015/081995, dated Mar. 24, 2016, 6 pages.

3GPP TS 23A02 V13.2.0 (Jun. 2015),3rd Generation Partnership Project;Technical Specification Group Services and System Aspects;Architecture enhancements for non-3GPP accesses(Release 13),total 292 pages.

3GPP TSG CT4 Meeting #69 C4-150823,"IMEISV signalling for WLAN access",Alcatel-Lucent et al.,Change Request 29.273 CR 0411,Current version: 12.7.0,May 25-29, 2015,total 37 pages.

Extended European Search Report issued in European Application No. 15895280 dated Apr. 18, 2018, 12 pages.

3GPP TS 23.402 V123.0 (Dec. 2013), 3rd Generation Partnership Project;Technical Specification Group Services and System Aspects; Architecture enhancements for non-3GPP accesses (Release 12), 288 pages.

CN Office Action in Chinese Application No. 201580069885.3, dated Apr. 26, 2019, 11 pages (with English translation).

* cited by examiner

NETWORK STATUS INFORMATION TRANSFER METHOD AND NETWORK DEVICE

CROSS-REFERENCE TO RELATED APPLICATIONS

This application is a continuation of International Application No. PCT/CN2015/081995, filed on Jun. 19, 2015, the disclosure of which is hereby incorporated by reference in its entirety.

TECHNICAL FIELD

The present invention relates to the communications field, and in particular, to a network status information transfer method and a network device.

BACKGROUND

Wireless local area networks (WLAN) for accessing the 3rd Generation Partnership Project (3GPP) evolved packet core (EPC) may be classified into trusted WLAN networks (TWAN) and untrusted WLAN networks. Whether a WLAN network is trusted is determined by an operator. An EPC network is accessed by using a TWAN in multiple modes including a transparent single-connection mode (TSCM). This connection mode is completely based on existing signaling transmission between UE and a WLAN. That is, UE can access a core network EPC by using a WLAN without enhancing any lower-layer signaling for the UE. For the UE, the UE does not sense that the UE accesses a 3GPP core network, and senses only that the UE is connected to a WLAN. This can be implemented without adding any signaling between the UE and the WLAN.

As described above, restricted by the characteristic of the TSCM connection mode, when a packet data network gateway (PGW) in an EPC is overloaded, the PGW sends an overload message to a TWAN, and the TWAN rejects access by UE. In this way, the UE adds, to a blacklist of the UE, a service set identifier (SSID) of the TWAN to which the UE fails to access, and the UE no longer accesses the TWAN. However, the PGW is overloaded, that is, a network status is undesirable only temporarily, and after the network status recovers, the TWAN can still be accessed. That is, the UE wrongly adds, to the blacklist, the SSID of the TWAN to which the UE fails to access because the PGW is overloaded. In addition, because no lower-layer signaling can be enhanced for the UE in the TSCM connection mode, the TWAN cannot notify the UE of a specific access rejection reason.

To avoid this case, in a current 3GPP standard protocol, a TWAN may reselect a PGW for UE to avoid PGW overload, to resolve a blacklist problem caused because access by the UE is rejected without any reason. However, in a process in which a TWAN selects a PGW for UE, a PGW selection mechanism includes a load balancing mechanism. That is, when a PGW is overloaded, another PGW that has a same access point name (APN) is usually also overloaded. Therefore, the current alleviation policy cannot effectively resolve this problem, and in most cases, the UE still adds an SSID of the TWAN to the blacklist.

SUMMARY

Embodiments of the present invention provide a network status information transfer method and a network device, to resolve a problem that UE wrongly adds, to a blacklist, an SSID of a TWAN to which the UE fails to access because a PGW is overloaded.

According to a first aspect, a network status information transfer method is provided, including:

determining, by a network device, that access to a trusted WLAN network TWAN by user equipment UE is rejected because a packet data network gateway PGW is overloaded; and if access to the TWAN is rejected because the PGW is overloaded, instructing, by the network device, a third-party server to send a first message to the UE, where the first message includes an identifier of the TWAN, and first indication information that is used to indicate that the PGW is overloaded.

With reference to the first aspect, in a first possible implementation of the first aspect, the network device is the PGW, the TWAN, or a policy and charging rules function PCRF; and the first message is used to instruct the UE not to add the identifier of the TWAN to a blacklist.

With reference to the first possible implementation of the first aspect, in a second possible implementation, the instructing a third-party server to send a first message to the UE includes:

sending a second message to the third-party server by using a service capability exposure function SCEF, so that the third-party server sends the first message to the UE according to the second message, where the second message includes an identifier of the UE, the identifier of the TWAN, and second indication information that is used to represent that the PGW is overloaded.

With reference to the second possible implementation of the first aspect, in a third possible implementation, the first indication information is an overload indication or an access delay indication, and the second indication information is the overload indication or the access delay indication.

According to a second aspect, a network status information transfer method is provided, including:

receiving, by a service capability exposure function SCEF, a first message sent by a network device, where the first message includes an identifier of user equipment UE, an identifier of a trusted WLAN network TWAN, and first indication information that is used to represent that a packet data network gateway PGW is overloaded; and instructing, by the SCEF according to the first message, a third-party server to send a second message to the UE, where the second message includes the identifier of the trusted WLAN network TWAN, and second indication information that is used to represent that the packet data network gateway PGW is overloaded.

With reference to the second aspect, in a first possible implementation of the second aspect, the network device is the TWAN, the PGW, or a policy and charging rules function PCRF; and the second message is used to instruct the UE not to add the identifier of the TWAN to a blacklist.

With reference to the second aspect or the first possible implementation of the second aspect, in a second possible implementation, the first indication information is an overload indication or an access delay indication, and the second indication information is the overload indication or the access delay indication.

With reference to the second aspect or the first possible implementation or the second possible implementation of the second aspect, in a third possible implementation, before the receiving, by an SCEF, a first message sent by a network device, the method further includes:

sending, by the SCEF, an overload monitoring subscription request to the TWAN, where the overload monitoring subscription request is used to subscribe to overload information of the PGW from the TWAN, and the overload monitoring subscription request includes an identifier of the SCEF; and receiving, by the SCEF, an overload monitoring subscription response sent by the TWAN.

With reference to the second aspect or the first possible implementation or the second possible implementation of the second aspect, in a fourth possible implementation, before the receiving, by an SCEF, a first message sent by a network device, the method further includes:

receiving, by the SCEF, an overload monitoring subscription request sent by the third-party server, to subscribe to overload information of the PGW from the SCEF, where the overload monitoring subscription request includes an identifier of the third-party server and a PGW overload monitoring request.

According to a third aspect, a network status information transfer method is provided, including:

after a third-party server establishes a connection to user equipment UE, receiving, by the third-party server, a first message sent by a service capability exposure function SCEF, where the first message includes an identifier of the UE, an identifier of a trusted WLAN network TWAN, and first indication information that is used to represent that a packet data network gateway PGW is overloaded; and sending, by the third-party server, a second message to the UE, where the second message includes the identifier of the TWAN, and second indication information that is used to represent that the PGW is overloaded.

With reference to the third aspect, in a first possible implementation of the third aspect, the second message is used to instruct the UE not to add the identifier of the TWAN to a blacklist.

With reference to the third aspect or the first possible implementation of the third aspect, in a second possible implementation of the third aspect, the first indication information is an overload indication or an access delay indication, and the second indication information is the overload indication or the access delay indication.

With reference to the first possible implementation or the second possible implementation of the third aspect, in a third possible implementation of the third aspect, before the sending, by the third-party server, a second message to the UE, the method further includes:

receiving, by the third-party server, a network status query message sent by the UE, where the network status query message is used to determine whether the PGW is overloaded.

With reference to the first possible implementation or the second possible implementation of the third aspect, in a fourth possible implementation of the third aspect, before the receiving a first message sent by a service capability exposure function SCEF, the method further includes:

sending, by the third-party server, an overload monitoring subscription request to the SCEF, to subscribe to overload information of the PGW from the SCEF, where the overload monitoring subscription request includes an identifier of the third-party server and a PGW overload monitoring request.

According to a fourth aspect, a network status information transfer method is provided, including:

receiving, by user equipment UE, a first message sent by a third-party server, where the first message includes an identifier of a trusted WLAN network TWAN, and first indication information that is used to represent that a packet data network gateway PGW is overloaded; and if the UE has added the identifier of the TWAN to a blacklist, deleting, by the UE, the identifier of the TWAN from the blacklist.

With reference to the fourth aspect, in a first possible implementation of the fourth aspect, the first indication information is an overload indication or an access delay indication.

With reference to the fourth aspect or the first possible implementation of the fourth aspect, in a second possible implementation of the fourth aspect, before the receiving, by UE, a first message sent by a third-party server, the method further includes:

sending, by the UE, a network status query message to the third-party server, where the network status query message is used to determine whether the PGW is overloaded.

According to a fifth aspect, a network device is provided, including:

a determining unit, configured to determine that access to a trusted WLAN network TWAN by user equipment UE is rejected because a packet data network gateway PGW is overloaded; and a processing unit, configured to: if access to the TWAN is rejected because the PGW is overloaded, instruct a third-party server to send a first message to the UE, where the first message includes an identifier of the TWAN, and first indication information that is used to indicate that the PGW is overloaded.

With reference to the fifth aspect, in a first possible implementation of the fifth aspect, the network device is the PGW, the TWAN, or a policy and charging rules function PCRF; and the first message is used to instruct the UE not to add the identifier of the TWAN to a blacklist.

With reference to the first possible implementation of the fifth aspect, in a second possible implementation of the fifth aspect, the processing unit is specifically configured to:

send a second message to the third-party server by using a service capability exposure function SCEF, so that the third-party server sends the first message to the UE according to the second message, where the second message includes an identifier of the UE, the identifier of the TWAN, and second indication information that is used to represent that the PGW is overloaded.

With reference to the second possible implementation of the fifth aspect, in a third possible implementation of the fifth aspect, the first indication information is an overload indication or an access delay indication, and the second indication information is the overload indication or the access delay indication.

According to a sixth aspect, a service capability exposure function SCEF is provided, including:

a receiving unit, configured to receive a first message sent by a network device, where the first message includes an identifier of user equipment UE, an identifier of a trusted WLAN network TWAN, and first indication information that is used to represent that a packet data network gateway PGW is overloaded; and a sending unit, configured to instruct, according to the first message, a third-party server to send a second message to the UE, where the second message includes the identifier of the TWAN, and second indication information that is used to represent that the packet data network gateway PGW is overloaded.

With reference to the sixth aspect, in a first possible implementation of the sixth aspect, the network device is the TWAN, the PGW, or a policy and charging rules function PCRF; and the second message is used to instruct the UE not to add the identifier of the TWAN to a blacklist.

With reference to the sixth aspect or the first possible implementation of the sixth aspect, in a second possible implementation, the first indication information is an overload indication or an access delay indication, and the second indication information is the overload indication or the access delay indication.

With reference to the sixth aspect or the first possible implementation or the second possible implementation of the sixth aspect, in a third possible implementation, the sending unit is further configured to send an overload monitoring subscription request to the TWAN, where the overload monitoring subscription request is used to subscribe to overload information of the PGW from the TWAN, and the overload monitoring subscription request includes an identifier of the SCEF; and the receiving unit is further configured to receive an overload monitoring subscription response sent by the TWAN.

With reference to the sixth aspect or the first possible implementation or the second possible implementation of the sixth aspect, in a fourth possible implementation, the receiving unit is further configured to receive an overload monitoring subscription request sent by the third-party server, to subscribe to overload information of the PGW from the SCEF, where the overload monitoring subscription request includes an identifier of the third-party server and a PGW overload monitoring request.

According to a seventh aspect, a third-party server is provided, including:

a receiving unit, configured to: after a connection to user equipment UE is established, receive a first message sent by a service capability exposure function SCEF, where the first message includes an identifier of the UE, an identifier of a trusted WLAN network TWAN, and first indication information that is used to represent that a packet data network gateway PGW is overloaded; and a sending unit, configured to send a second message to the UE, where the second message includes the identifier of the TWAN, and second indication information that is used to represent that the PGW is overloaded.

With reference to the seventh aspect, in a first possible implementation of the seventh aspect, the second message is used to instruct the UE not to add the identifier of the TWAN to a blacklist.

With reference to the seventh aspect or the first possible implementation of the seventh aspect, in a second possible implementation of the seventh aspect, the first indication information is an overload indication or an access delay indication, and the second indication information is the overload indication or the access delay indication.

With reference to the seventh aspect or the first possible implementation or the second possible implementation of the seventh aspect, in a third possible implementation of the seventh aspect, the receiving unit is further configured to receive a network status query message sent by the UE, where the network status query message is used to determine whether the PGW is overloaded.

With reference to the seventh aspect or the first possible implementation or the second possible implementation of the seventh aspect, in a fourth possible implementation of the seventh aspect, the sending unit is further configured to send an overload monitoring subscription request to the SCEF, to subscribe to overload information of the PGW from the SCEF, where the overload monitoring subscription request includes an identifier of the third-party server and a PGW overload monitoring request.

According to an eighth aspect, user equipment UE is provided, including:

a receiving unit, configured to receive a first message sent by a third-party server, where the first message includes an identifier of a trusted WLAN network TWAN, and first indication information that is used to represent that a packet data network gateway PGW is overloaded; and a deletion unit, configured to: if the UE has added the identifier of the TWAN to a blacklist, delete the identifier of the TWAN from the blacklist.

With reference to the eighth aspect, in a first possible implementation of the eighth aspect, the first indication information is an overload indication or an access delay indication.

With reference to the eighth aspect or the first possible implementation of the eighth aspect, in a second possible implementation of the eighth aspect, the sending unit is further configured to send a network status query message to the third-party server, where the network status query message is used to determine whether the PGW is overloaded.

The embodiments of the present invention provide the network status information transfer method and the network device. The network device determines that access to the trusted WLAN network TWAN by the user equipment UE is rejected because the packet data network gateway PGW is overloaded; and if access to the TWAN is rejected because the PGW is overloaded, the network device instructs the third-party server to send the first message to the UE, where the first message includes the identifier of the TWAN and the first indication information that is used to indicate that the PGW is overloaded. In this way, user plane data is transmitted between the third-party server and the UE, and no lower-layer signaling needs to be enhanced for the UE, thereby resolving a problem that UE wrongly adds, to a blacklist, an SSID of a TWAN to which the UE fails to access because a PGW is overloaded.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
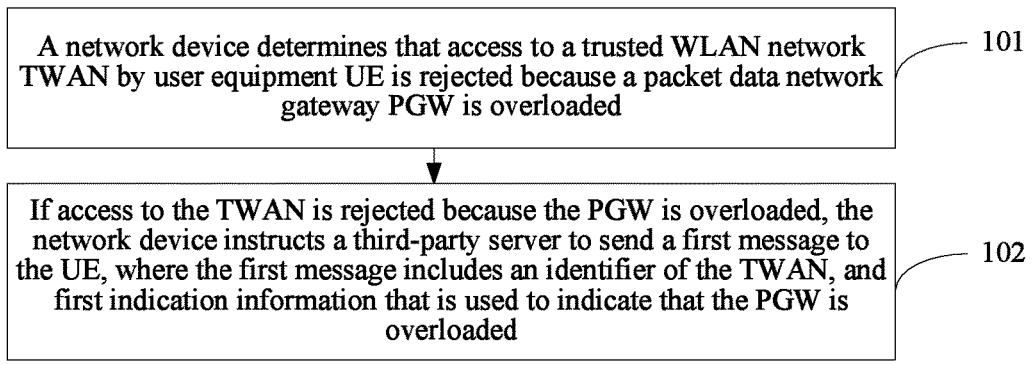
FIG. 1 is a schematic flowchart of a network status information transfer method according to an embodiment of the present invention.

An embodiment of the present invention provides a network status information transfer method. As shown in FIG. 1, the method includes the following steps:

101: A network device determines that access to a trusted WLAN network TWAN by user equipment UE is rejected because a packet data network gateway PGW is overloaded.

102: If access to the TWAN is rejected because the PGW is overloaded, the network device instructs a third-party server to send a first message to the UE, where the first message includes an identifier of the TWAN, and first indication information that is used to indicate that the PGW is overloaded.

The network device may be the PGW, the TWAN, or a policy and charging rules function (PCRF).

A 3GPP core network EPC is accessed by using the TWAN in a TSCM mode, and consequently no lower-layer signaling can be enhanced for the UE. In this case, after the UE is connected to the third-party server by using a 3GPP network, if the UE attempts to access the TWAN but access is rejected, the UE cannot learn a specific reason for rejecting access to the TWAN, and the network device determines that access to the TWAN by the UE is rejected because the PGW is overloaded, the network device may instruct the third-party server to notify the UE that access is rejected because the PGW is overloaded. User plane data is sent between the third-party server and the UE, and no lower-layer signaling needs to be enhanced for the UE to transmit the user plane data. Therefore, the third-party server may send the first message to the UE to notify the UE that access is rejected because the PGW is overloaded. In this way, the UE can skip adding the identifier of the TWAN to a blacklist, and the UE can still access the TWAN when the PGW recovers.

For the UE, an application program client may be added to the UE, or an operating system of the UE may be updated, to update the identifier of the TWAN in the blacklist.

In the foregoing communications system, the third-party server may be an access network discovery and selection function (ANDSF), or may be another server. This is not limited in this application. The ANDSF is defined in 3GPP R10 to automatically select a network from different access networks, serves as an access anchor to intelligently select a network, and implements effective offloading of network access by means of interaction and coordination between a network and a terminal.

In a specific implementation, after the UE establishes a 3GPP connection such as a Transmission Control Protocol (TCP) connection to the third-party server, if the UE needs to access the TWAN, the UE sends an access request message (such as access request) to the TWAN. The access request message carries an identity of the UE, that is, an ID of the UE. The ID of the UE may be an international mobile subscriber identity (IMSI), a network access identifier (NAI), a mobile subscriber number (MSISDN), or the like. This is not limited in this application. After the TWAN receives the access request message, the TWAN sends the access request message to the PGW. If overload occurs on the PGW side and overload control needs to be performed, an overload indication (such as overload indication) is sent to the TWAN, and the TWAN sends an access rejection message (such as access fail) to the UE. In this case, the UE adds the identifier of the TWAN to a local blacklist, and the UE no longer chooses to access the TWAN.

In this way, both the TWAN and the PGW determine that access to the TWAN by the UE is rejected because the PGW is overloaded.

Subsequently, the PGW or the TWAN sends a second message to the third-party server, that is, the third-party server receives the second message sent by the PGW or the TWAN. The second message includes the ID of the UE, an ID of the TWAN, and second indication information that is used to represent that the PGW is overloaded.

Specifically, the third-party server may receive the second message that is sent by the PGW or the TWAN by using a capability exposure function (SCEF). Optionally, because a new status of the PGW is notified to a PCRF, that is, the PCRF also learns that access to the TWAN by the UE is rejected because the PGW is overloaded, the third-party server may also receive the second message that is sent by the PCRF by using the SCEF.

That is, the PGW or the TWAN may send the second message to the SCEF, and the SCEF sends the second message to the third-party server. Alternatively, because status information of the PGW is notified to the PCRF, the PCRF may send the second message to the SCEF, and the SCEF sends the second message to the third-party server.

The TWAN may send the second message to the SCEF by using a trusted WLAN access gateway (TWAG) in the TWAN.

It should be noted that, the network device may immediately send the second message to the SCEF after determining a reason for rejecting access to the TWAN by the UE, or may send the second message to the SCEF after waiting for a period of time or when another condition is satisfied. This is not limited in this application.

Subsequently, the third-party server generates the first message according to the second message, where the first message includes the ID of the TWAN, and the first indication information that is used to represent that the PGW is overloaded, and sends the first message to the UE. When the UE receives the first message, if the UE has added the ID of the TWAN to the blacklist, the UE deletes the ID of the TWAN from the blacklist. If the UE receives, before receiving an access rejection response sent by the TWAN, the first message sent by the third-party server, that is, the UE has not added the ID of the TWAN to the blacklist, the UE does not add the ID of the TWAN to the blacklist.

The ID of the TWAN may be a service set identifier (SSID), a basic service set identifier (BSSID), an extended service set identifier (ESSID), or the like.

The first indication information may be an overload indication or an access delay indication (such as back off timer), and the second indication information may be the overload indication or the access delay indication. The first indication information may be the same as or different from the second indication information. For example, the first indication information may be network status information (such as network status indication), for example, the overload indication, and the second indication information may be information for ordering the UE to perform an operation (such as order indication), for example, the access delay indication.

If the first indication information is the access delay indication, the UE may be configured to send the access request message to the TWAN again after waiting for a preset period of time, to attempt to access the TWAN.

When the third-party server sends the first message to the UE, the third-party server may first send the first message to another 3GPP PGW that is connected to the UE and that is not overloaded, and the 3GPP PGW sends the first message to the UE by using a 3GPP network (such as a serving gateway and a base station).

In the foregoing implementation, after the third-party server receives the second message sent by the SCEF, the third-party server actively sends the first message to the UE, to notify the UE that access to the TWAN by the UE is rejected because the PGW is overloaded. In another possible implementation, when access to the TWAN by the UE is rejected, the UE may actively query, by using user plane data, the third-party server whether access is rejected because the PGW is overloaded. In this case, before the UE receives the first message sent by the third-party server, the UE may be further configured to send a network status query message to the third-party server, to determine whether the PGW is overloaded. Specifically, the UE may first send the network status query message to a 3GPP network (including a base station and a serving gateway), and the 3GPP network sends the network status query message to the third-party server. If the third-party server has received, before receiving the network status query message, the second message sent by the SCEF, the UE receives the first message from the third-party server and determines that the PGW is overloaded, and therefore does not add the ID of the TWAN to the blacklist. If the third-party server has not received the second message before receiving the network status query message, the UE may receive a network status response message from the third-party server. The network status response message is used to notify the UE that the PGW is not overloaded. In this way, the UE learns that access to the TWAN is currently rejected not because the PGW is overloaded. In this case, if the UE has added the ID of the TWAN to the blacklist, the UE performs no processing. If the UE has not added the ID of the TWAN to the blacklist, the UE adds the ID of the TWAN to the blacklist. Alternatively, the third-party server may not return a network status response message to the UE, to indicate that the PGW is not overloaded. If the UE has not received a network status response message within a preset time, the UE adds the ID of the TWAN to the blacklist.

In addition, if the TWAN notifies the SCEF of the second message, the SCEF may further subscribe from the TWAN in advance, so that when there is an event that access by the UE is rejected because the PGW is overloaded, the TWAN may notify the SCEF of this event. Therefore, the TWAN may be further configured to receive an overload monitoring subscription request sent by the SCEF, where the overload monitoring subscription request is used to subscribe to overload information of the PGW from the TWAN. This includes: if the TWAN receives the overload monitoring subscription request, the TWAN sends an overload monitoring subscription response to the SCEF.

Whether the TWAN or the PGW notifies the third-party server of the overload information of the PGW, the second message needs to be sent to the third-party server by using the SCEF. The SCEF serves as an intermediate node and is responsible for managing issues related to capability exposure such as a security problem and an efficiency problem. Alternatively, the third-party server may subscribe from the SCEF in advance, so that when the SCEF learns the event that access to the TWAN by the UE is rejected because the PGW is overloaded, the SCEF notifies the third-party server of this event. Therefore, the third-party server may be further configured to send an overload monitoring subscription request to the SCEF, to subscribe to the overload information of the PGW from the SCEF. The overload information includes an identifier of the third-party server (such as AS ID) and a PGW overload monitoring request (such as a PGW overload monitoring event). In this way, if the SCEF learns the event that access to the TWAN by the UE is rejected because the PGW is overloaded, that is, receives the second message, the SCEF sends the second message to the third-party server.

Figure 2:
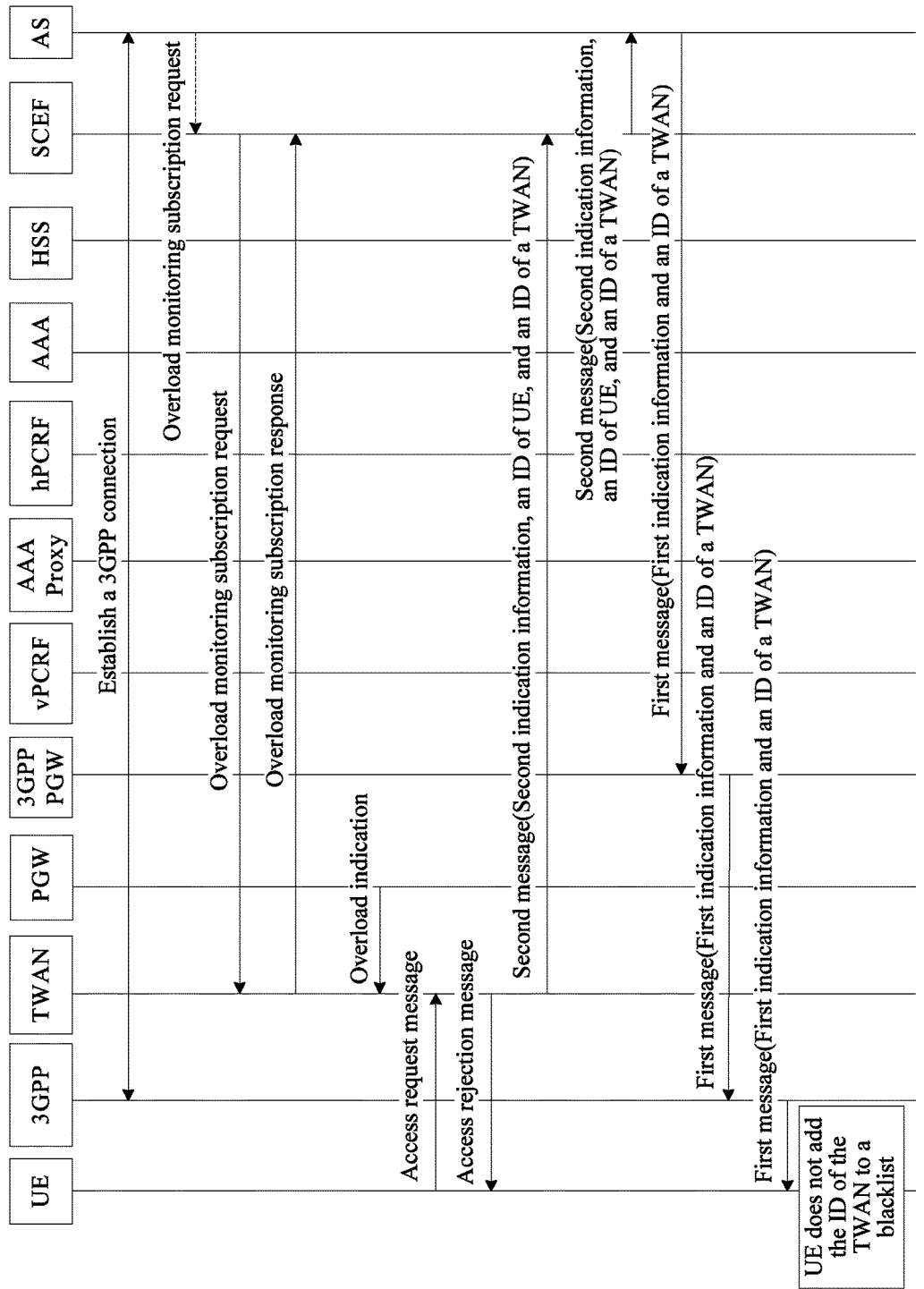
FIG. 2 is a schematic diagram of signal exchange in network status information transfer according to an embodiment of the present invention.

In conclusion, if the TWAN sends the second message to the SCEF, as shown in FIG. 2, FIG. 2 is a flowchart in which the third-party server AS actively sends network status information (such as the second message) to the UE by using user plane data.

Figure 3:
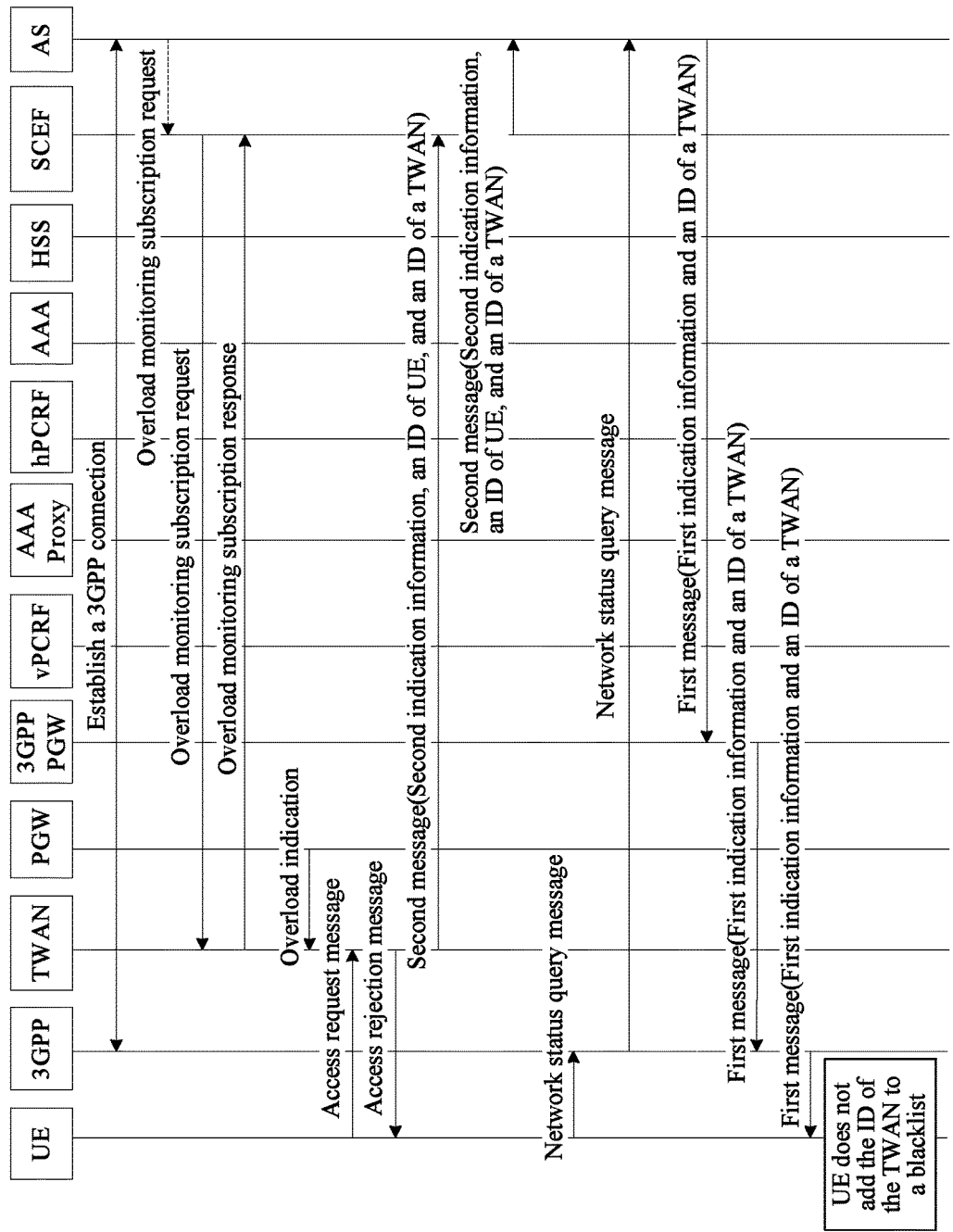
FIG. 3 is another schematic diagram of signal exchange in network status information transfer according to an embodiment of the present invention.

If the TWAN sends the second message to the SCEF, as shown in FIG. 3, FIG. 3 is a flowchart in which the UE actively applies for network status information from the third-party server AS by using user plane data.

This embodiment of the present invention provides the network status information transfer method. The network device determines that access to the trusted WLAN network TWAN by the user equipment UE is rejected because the packet data network gateway PGW is overloaded; and if access to the TWAN is rejected because the PGW is overloaded, the network device instructs the third-party server to send the first message to the UE, where the first message includes the identifier of the TWAN and the first indication information that is used to indicate that the PGW is overloaded. In this way, user plane data is transmitted between the third-party server and the UE, and no lower-layer signaling needs to be enhanced for the UE, thereby resolving a problem that UE wrongly adds, to a blacklist, an SSID of a TWAN to which the UE fails to access because a PGW is overloaded.

With reference to the foregoing embodiments, specific implementations of various network elements are described below.

Figure 4:
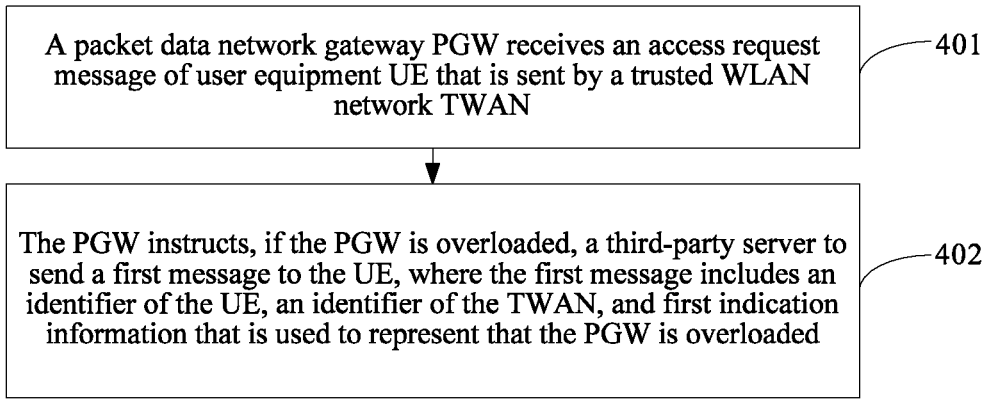
FIG. 4 is a schematic flowchart of a network status information transfer method according to another embodiment of the present invention.

Another embodiment of the present invention provides a network status information transfer method. As shown in FIG. 4, the method includes the following steps:

401: A packet data network gateway PGW receives an access request message of user equipment UE that is sent by a trusted WLAN network TWAN.

402: The PGW instructs, if the PGW is overloaded, a third-party server to send a first message to the UE, where the first message includes an identifier of the TWAN, and first indication information that is used to represent that the PGW is overloaded.

For example, the first message may be used to instruct the UE not to add the identifier of the TWAN to a blacklist.

The instructing, by the PGW if the PGW is overloaded, a third-party server to send a first message to the UE may include:

if the PGW is overloaded, sending a second message to the third-party server by using a service capability exposure function SCEF, so that the third-party server sends the first message to the UE according to the second message, where the second message includes an identifier of the UE, the identifier of the TWAN, and second indication information that is used to represent that the PGW is overloaded; or if the PGW is overloaded, sending a second message to the third-party server by using a policy and charging rules function PCRF and an SCEF, so that the third-party server sends the first message to the UE according to the second message, where the second message includes an identifier of the UE, the identifier of the TWAN, and second indication information that is used to represent that the PGW is overloaded.

Optionally, the first indication information is an overload indication or an access delay indication, and the second indication information is the overload indication or the access delay indication.

This embodiment of the present invention provides the network status information transfer method. The packet data network gateway PGW receives the access request message of the user equipment UE that is sent by the trusted WLAN network TWAN. If the PGW is overloaded, the PGW instructs the third-party server to send the first message to the UE. The first message includes the identifier of the TWAN, and the first indication information that is used to represent that the PGW is overloaded. For example, the first message is used to instruct the UE not to add the identifier of the TWAN to the blacklist. In this way, user plane data is transmitted between the third-party server and the UE, and no lower-layer signaling needs to be enhanced for the UE, thereby resolving a problem that UE wrongly adds, to a blacklist, an SSID of a TWAN to which the UE fails to access because a PGW is overloaded.

Figure 5:
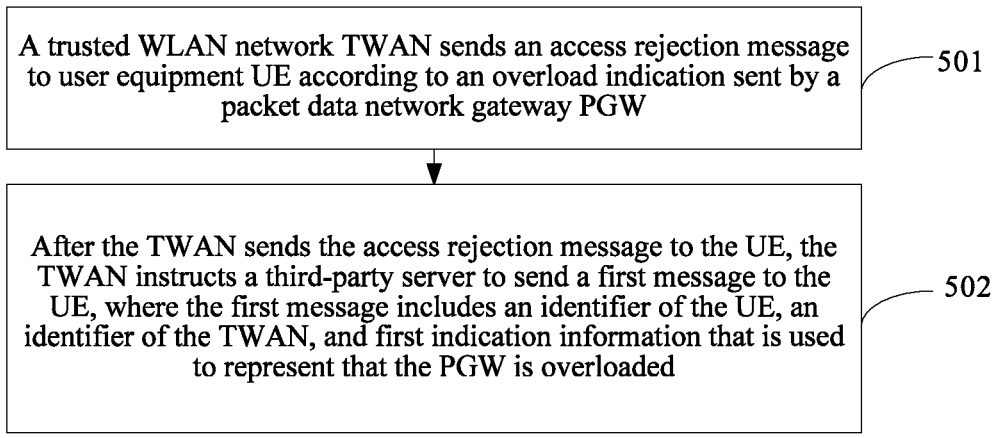
FIG. 5 is a schematic flowchart of a network status information transfer method according to still another embodiment of the present invention.

Still another embodiment of the present invention provides a network status information transfer method. As shown in FIG. 5, the method includes the following steps:

501: A trusted WLAN network TWAN sends an access rejection message to user equipment UE according to an overload indication sent by a packet data network gateway PGW.

502: After the TWAN sends the access rejection message to the UE, the TWAN instructs a third-party server to send a first message to the UE, where the first message includes an identifier of the TWAN, and first indication information that is used to represent that the PGW is overloaded.

For example, the first indication information is used to instruct the UE not to add the identifier of the TWAN to a blacklist.

The instructing, by the TWAN, a third-party server to send a first message to the UE may include:

sending, by the TWAN, a second message to the third-party server by using a service capability exposure function SCEF, so that the third-party server sends the first message to the UE according to the second message, where the second message includes an identifier of the UE, the identifier of the TWAN, and second indication information that is used to represent that the PGW is overloaded.

The first indication information is an overload indication or an access delay indication, and the second indication information is the overload indication or the access delay indication.

Optionally, before the instructing, by the TWAN, a third-party server to send a first message to the UE, the method may further include:

receiving, by the TWAN, an overload monitoring subscription request sent by an SCEF, where the overload monitoring subscription request is used to subscribe to overload information of the PGW from the TWAN, and the overload monitoring subscription request includes an ID of the SCEF; and sending, by the TWAN, an overload monitoring subscription response to the SCEF.

This embodiment of the present invention provides the network status information transfer method. The trusted WLAN network TWAN sends the access rejection message to the user equipment UE according to the overload indication sent by the packet data network gateway PGW. After the TWAN sends the access rejection message to the UE, the TWAN instructs the third-party server to send the first message to the UE, where the first message includes the identifier of the TWAN, and the first indication information that is used to represent that the PGW is overloaded. For example, the first indication information is used to instruct the UE not to add the identifier of the TWAN to the blacklist. In this way, user plane data is transmitted between the third-party server and the UE, and no lower-layer signaling needs to be enhanced for the UE, thereby resolving a problem that UE wrongly adds, to a blacklist, an SSID of a TWAN to which the UE fails to access because a PGW is overloaded.

Figure 6:
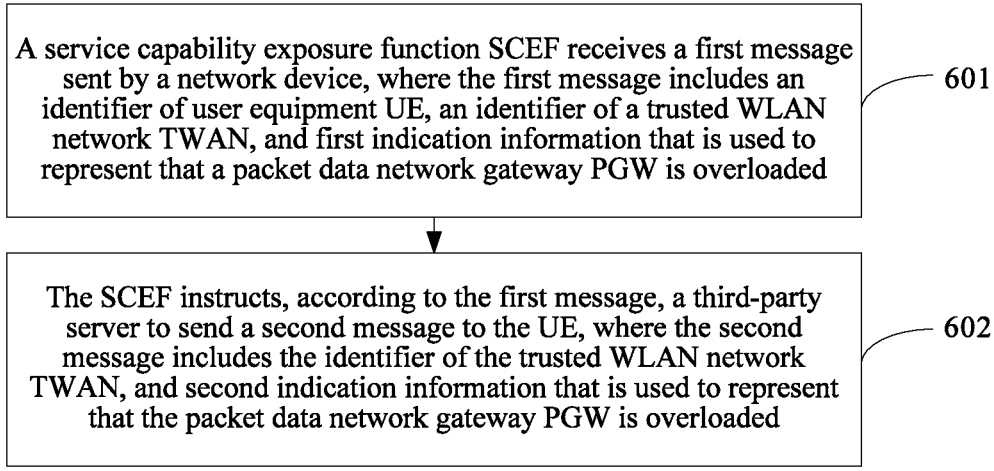
FIG. 6 is a schematic flowchart of a network status information transfer method according to still another embodiment of the present invention.

Still another embodiment of the present invention provides a network status information transfer method. As shown in FIG. 6, the method includes the following steps:

601: A service capability exposure function SCEF receives a first message sent by a network device, where the first message includes an identifier of user equipment UE, an identifier of a trusted WLAN network TWAN, and first indication information that is used to represent that a packet data network gateway PGW is overloaded.

602: The SCEF instructs, according to the first message, a third-party server to send a second message to the UE, where the second message includes the identifier of the trusted WLAN network TWAN, and second indication information that is used to represent that the packet data network gateway PGW is overloaded.

For example, the second message is used to instruct the UE not to add the identifier of the TWAN to a blacklist.

The network device may be the TWAN, the PGW, or a policy and charging rules function PCRF.

The first indication information may be an overload indication or an access delay indication, and the second indication information is the overload indication or the access delay indication.

Before the receiving, by an SCEF, a first message sent by a network device, the method may further include:

sending, by the SCEF, an overload monitoring subscription request to the TWAN, where the overload monitoring subscription request is used to subscribe to overload information of the PGW from the TWAN, and the overload monitoring subscription request includes an ID of the SCEF; and receiving, by the SCEF, an overload monitoring subscription response sent by the TWAN.

Before the receiving, by an SCEF, a first message sent by a network device, the method may further include:

receiving, by the SCEF, an overload monitoring subscription request sent by the third-party server, to subscribe to overload information of the PGW from the SCEF, where the overload monitoring subscription request includes an identifier of the third-party server and a PGW overload monitoring request.

This embodiment of the present invention provides the network status information transfer method. The service capability exposure function SCEF receives the first message sent by the network device, where the first message includes the identifier of the user equipment UE, the identifier of the trusted WLAN network TWAN, and the first indication information that is used to represent that the packet data network gateway PGW is overloaded. The SCEF instructs, according to the first message, the third-party server to send the second message to the UE, where the second message includes the identifier of the trusted WLAN network TWAN, and the second indication information that is used to represent that the packet data network gateway PGW is overloaded. For example, the second message is used to instruct the UE not to add the identifier of the TWAN to the blacklist. User plane data is transmitted between the third-party server and the UE, and no lower-layer signaling needs to be enhanced for the UE, thereby resolving a problem that UE wrongly adds, to a blacklist, an SSID of a TWAN to which the UE fails to access because a PGW is overloaded.

Figure 7:
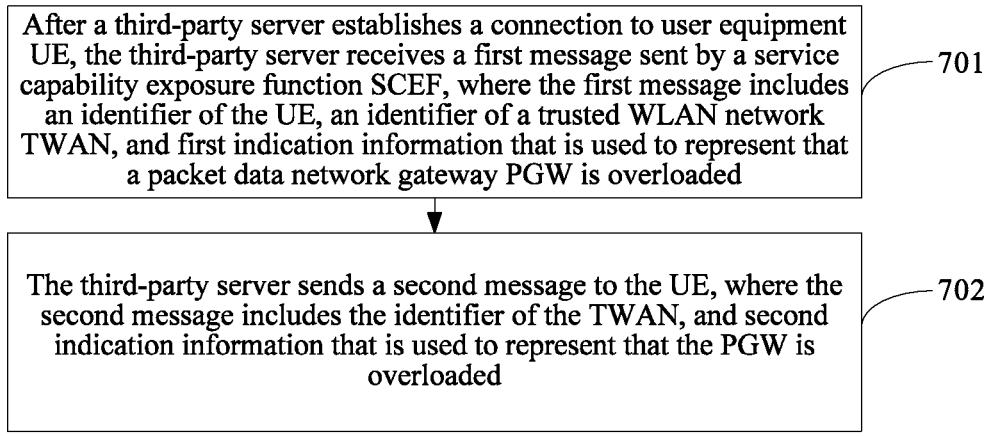
FIG. 7 is a schematic flowchart of a network status information transfer method according to still another embodiment of the present invention.

Still another embodiment of the present invention provides a network status information transfer method. As shown in FIG. 7, the method includes the following steps:

701: After a third-party server establishes a connection to user equipment UE, the third-party server receives a first message sent by a service capability exposure function SCEF, where the first message includes an identifier of the UE, an identifier of a trusted WLAN network TWAN, and first indication information that is used to represent that a packet data network gateway PGW is overloaded.

702: The third-party server sends a second message to the UE, where the second message includes the identifier of the TWAN, and second indication information that is used to represent that the PGW is overloaded.

For example, the second message may be used to instruct the UE not to add the identifier of the TWAN to a blacklist.

The first indication information may be an overload indication or an access delay indication, and the second indication information may be the overload indication or the access delay indication.

Before the sending, by the third-party server, a second message to the UE, the method may further include:

receiving, by the third-party server, a network status query message sent by the UE, where the network status query message is used to determine whether the PGW is overloaded.

Before the receiving a first message sent by a service capability exposure function SCEF, the method may further include:

sending, by the third-party server, an overload monitoring subscription request to the SCEF, to subscribe to overload information of the PGW from the SCEF, where the overload monitoring subscription request includes an identifier of the third-party server and a PGW overload monitoring request.

This embodiment of the present invention provides the network status information transfer method. After the third-party server establishes a connection to the user equipment UE, the third-party server receives the first message sent by the service capability exposure function SCEF, where the first message includes the identifier of the UE, the identifier of the trusted WLAN network TWAN, and the first indication information that is used to represent that the packet data network gateway PGW is overloaded. The third-party server sends the second message to the UE, where the second message includes the identifier of the TWAN, and the second indication information that is used to represent that the PGW is overloaded. For example, the second message may be used to instruct the UE not to add the identifier of the TWAN to the blacklist. User plane data is transmitted between the third-party server and the UE, and no lower-layer signaling needs to be enhanced for the UE, thereby resolving a problem that UE wrongly adds, to a blacklist, an SSID of a TWAN to which the UE fails to access because a PGW is overloaded.

Figure 8:
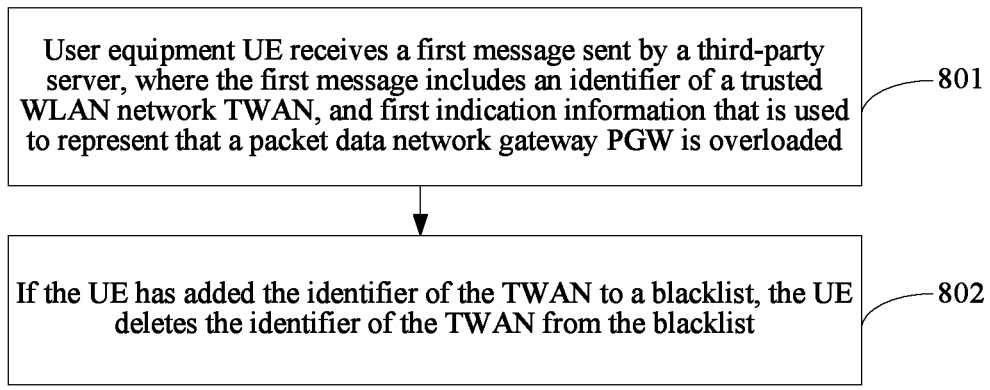
FIG. 8 is a schematic flowchart of a network status information transfer method according to still another embodiment of the present invention.

Still another embodiment of the present invention provides a network status information transfer method. As shown in FIG. 8, the method includes the following steps:

801: User equipment UE receives a first message sent by a third-party server, where the first message includes an identifier of a trusted WLAN network TWAN, and first indication information that is used to represent that a packet data network gateway PGW is overloaded.

802: If the UE has added the identifier of the TWAN to a blacklist, the UE deletes the identifier of the TWAN from the blacklist.

The first indication information is an overload indication or an access delay indication.

If the first indication information is the access delay indication, the method may further include:

sending, by the UE, an access request message to the TWAN after waiting for a preset period of time.

Before the receiving, by UE, a first message sent by a third-party server, the method further includes:

sending, by the UE, a network status query message to the third-party server, where the network status query message is used to determine whether the PGW is overloaded.

This embodiment of the present invention provides the network status information transfer method. The user equipment UE receives the first message sent by the third-party server, where the first message includes the identifier of the trusted WLAN network TWAN, and the first indication information that is used to represent that the packet data network gateway PGW is overloaded. If the UE has added the identifier of the TWAN to the blacklist, the UE deletes the identifier of the TWAN from the blacklist. User plane data is transmitted between the third-party server and the UE, and no lower-layer signaling needs to be enhanced for the UE, thereby resolving a problem that UE wrongly adds, to a blacklist, an SSID of a TWAN to which the UE fails to access because a PGW is overloaded.

Figure 9:
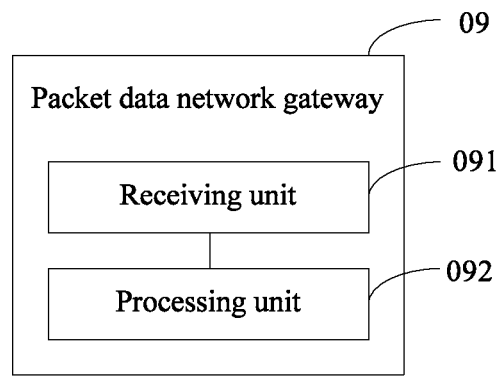
FIG. 9 is a schematic structural diagram of a packet data network gateway according to still another embodiment of the present invention.

Still another embodiment of the present invention provides a packet data network gateway PGW 09. As shown in FIG. 9, the PGW 09 includes:

a receiving unit 091, configured to receive an access request message of user equipment UE that is sent by a trusted WLAN network TWAN; and a processing unit 092, configured to: if the PGW is overloaded, instruct a third-party server to send a first message to the UE, where the first message includes an identifier of the TWAN, and first indication information that is used to represent that the PGW is overloaded.

Optionally, the first message is used to instruct the UE not to add the identifier of the TWAN to a blacklist.

Optionally, the processing unit 092 may be specifically configured to:

send a second message to the third-party server by using a service capability exposure function SCEF, so that the third-party server sends the first message to the UE according to the second message, where the second message includes an identifier of the UE, the identifier of the TWAN, and second indication information that is used to represent that the PGW is overloaded; or send a second message to the third-party server by using a policy and charging rules function PCRF and an SCEF, so that the third-party server sends the first message to the UE according to the second message, where the second message includes an identifier of the UE, the identifier of the TWAN, and second indication information that is used to represent that the PGW is overloaded.

Optionally, the first indication information is an overload indication or an access delay indication, and the second indication information is the overload indication or the access delay indication.

This embodiment of the present invention provides the packet data network gateway PGW. The PGW receives the access request message of the user equipment UE that is sent by the trusted WLAN network TWAN. If the PGW is overloaded, the PGW instructs the third-party server to send the first message to the UE. The first message includes the identifier of the TWAN, and the first indication information that is used to represent that the PGW is overloaded. For example, the first message is used to instruct the UE not to add the identifier of the TWAN to the blacklist. In this way, user plane data is transmitted between the third-party server and the UE, and no lower-layer signaling needs to be enhanced for the UE, thereby resolving a problem that UE wrongly adds, to a blacklist, an SSID of a TWAN to which the UE fails to access because a PGW is overloaded.

Figure 10:
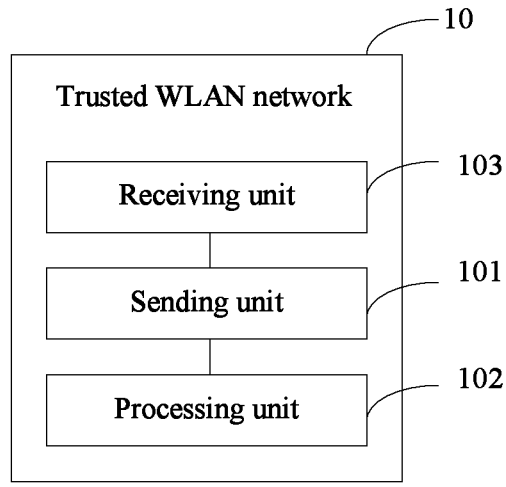
FIG. 10 is a schematic structural diagram of a trusted WLAN network according to still another embodiment of the present invention.

Still another embodiment of the present invention provides a trusted WLAN network TWAN 10. As shown in FIG. 10, the TWAN 10 includes:

a sending unit 101, configured to send an access rejection message to user equipment UE according to an overload indication sent by a packet data network gateway PGW; and a processing unit 102, further configured to: after the access rejection message is sent to the UE, instruct a third-party server to send a first message to the UE, where the first message includes an identifier of the TWAN, and first indication information that is used to represent that the PGW is overloaded.

Optionally, the first message is used to instruct the UE not to add the identifier of the TWAN to a blacklist.

Optionally, the processing unit 102 may be specifically configured to:

send a second message to the third-party server by using a service capability exposure function SCEF, so that the third-party server sends the first message to the UE according to the second message, where the second message includes an identifier of the UE, the identifier of the TWAN, and second indication information that is used to represent that the PGW is overloaded.

Optionally, the first indication information is an overload indication or an access delay indication, and the second indication information is the overload indication or the access delay indication.

Optionally, the TWAN 10 further includes:

a receiving unit 103, configured to receive an overload monitoring subscription request sent by an SCEF, where the overload monitoring subscription request is used to subscribe to overload information of the PGW from the TWAN, and the overload monitoring subscription request includes an ID of the SCEF; and the sending unit 101 may be further configured to send an overload monitoring subscription response to the SCEF.

This embodiment of the present invention provides the trusted WLAN network TWAN. The TWAN sends the access rejection message to the user equipment UE according to the overload indication sent by the packet data network gateway PGW. After the TWAN sends the access rejection message to the UE, the TWAN instructs the third-party server to send the first message to the UE, where the first message includes the identifier of the TWAN, and the first indication information that is used to represent that the PGW is overloaded. For example, the first indication information is used to instruct the UE not to add the identifier of the TWAN to the blacklist. In this way, user plane data is transmitted between the third-party server and the UE, and no lower-layer signaling needs to be enhanced for the UE, thereby resolving a problem that UE wrongly adds, to a blacklist, an SSID of a TWAN to which the UE fails to access because a PGW is overloaded.

Figure 11:
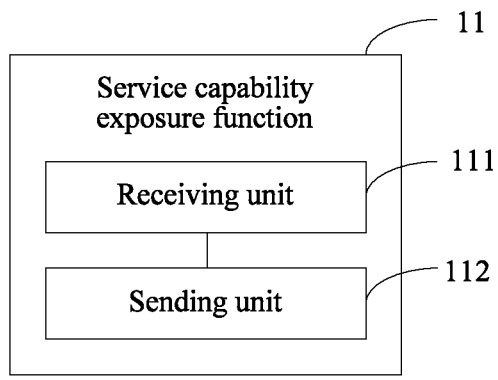
FIG. 11 is a schematic structural diagram of a service capability exposure function according to still another embodiment of the present invention.

Still another embodiment of the present invention provides a service capability exposure function SCEF 11. As shown in FIG. 11, the SCEF 11 includes:

a receiving unit 111, configured to receive a first message sent by a network device, where the first message includes an identifier of user equipment UE, an identifier of a trusted WLAN network TWAN, and first indication information that is used to represent that a packet data network gateway PGW is overloaded; and a sending unit 112, configured to instruct, according to the first message, a third-party server to send a second message to the UE, where the second message includes the identifier of the trusted WLAN network TWAN, and second indication information that is used to represent that the packet data network gateway PGW is overloaded.

Optionally, the second message is used to instruct the UE not to add the identifier of the TWAN to a blacklist.

Optionally, the network device is the TWAN, the PGW, or a policy and charging rules function PCRF.

The first indication information is an overload indication or an access delay indication, and the second indication information is the overload indication or the access delay indication.

Optionally, the sending unit 112 is further configured to send an overload monitoring subscription request to the TWAN, where the overload monitoring subscription request is used to subscribe to overload information of the PGW from the TWAN, and the overload monitoring subscription request includes an ID of the SCEF.

The receiving unit 111 is further configured to receive an overload monitoring subscription response sent by the TWAN.

Optionally, the receiving unit 111 is further configured to receive an overload monitoring subscription request sent by the third-party server, to subscribe to overload information of the PGW from the SCEF, where the overload monitoring subscription request includes an identifier of the third-party server and a PGW overload monitoring request.

This embodiment of the present invention provides the service capability exposure function SCEF. The SCEF receives the first message sent by the network device, where the first message includes the identifier of the user equipment UE, the identifier of the trusted WLAN network TWAN, and the first indication information that is used to represent that the packet data network gateway PGW is overloaded. The SCEF sends the second message to the UE by using the third-party server, where the second message includes the identifier of the trusted WLAN network TWAN, and the second indication information that is used to represent that the packet data network gateway PGW is overloaded. For example, the second message is used to instruct the UE not to add the identifier of the TWAN to the blacklist. User plane data is transmitted between the third-party server and the UE, and no lower-layer signaling needs to be enhanced for the UE, thereby resolving a problem that UE wrongly adds, to a blacklist, an SSID of a TWAN to which the UE fails to access because a PGW is overloaded.

Figure 12:
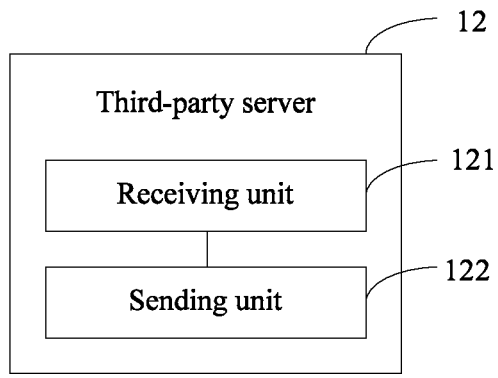
FIG. 12 is a schematic structural diagram of a third-party server according to still another embodiment of the present invention.

Still another embodiment of the present invention provides a third-party server 12. As shown in FIG. 12, the third-party server 12 includes:

a receiving unit 121, configured to: after a connection to user equipment UE is established, receive a first message sent by a service capability exposure function SCEF, where the first message includes an identifier of the UE, an identifier of a trusted WLAN network TWAN, and first indication information that is used to represent that a packet data network gateway PGW is overloaded; and a sending unit 122, configured to send a second message to the UE, where the second message includes the identifier of the TWAN, and second indication information that is used to represent that the PGW is overloaded.

Optionally, the second message is used to instruct the UE not to add the identifier of the TWAN to a blacklist.

Optionally, the first indication information is an overload indication or an access delay indication, and the second indication information is the overload indication or the access delay indication.

Optionally, the receiving unit 121 is further configured to receive a network status query message sent by the UE, where the network status query message is used to determine whether the PGW is overloaded.

Optionally, the sending unit 122 is further configured to send an overload monitoring subscription request to the SCEF, where the overload monitoring subscription request is used to subscribe to overload information of the PGW from the SCEF, and the overload monitoring subscription request includes an identifier of the third-party server and a PGW overload monitoring request.

This embodiment of the present invention provides the third-party server. After the third-party server establishes a connection to the user equipment UE, the third-party server receives the first message sent by the service capability exposure function SCEF, where the first message includes the identifier of the UE, the identifier of the trusted WLAN network TWAN, and the first indication information that is used to represent that the packet data network gateway PGW is overloaded. The third-party server sends the second message to the UE, where the second message includes the identifier of the TWAN, and the second indication information that is used to represent that the PGW is overloaded. For example, the second message may be used to instruct the UE not to add the identifier of the TWAN to the blacklist. User plane data is transmitted between the third-party server and the UE, and no lower-layer signaling needs to be enhanced for the UE, thereby resolving a problem that UE wrongly adds, to a blacklist, an SSID of a TWAN to which the UE fails to access because a PGW is overloaded.

Figure 13:
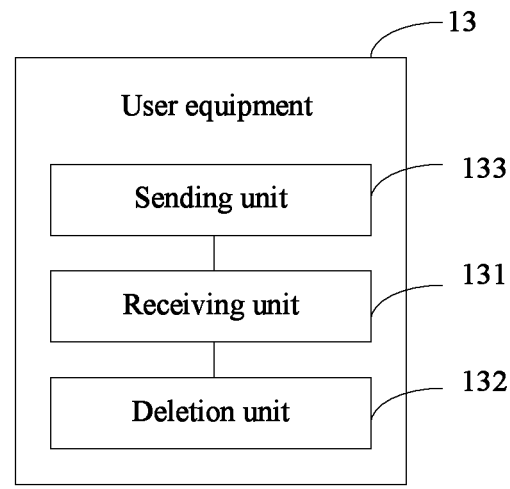
FIG. 13 is a schematic structural diagram of user equipment according to still another embodiment of the present invention.

Still another embodiment of the present invention provides user equipment UE 13. As shown in FIG. 13, the UE 13 includes:

a receiving unit 131, configured to receive a first message sent by a third-party server, where the first message includes an identifier of a trusted WLAN network TWAN, and first indication information that is used to represent that a packet data network gateway PGW is overloaded; and a deletion unit 132, configured to: if the UE has added the identifier of the TWAN to a blacklist, delete the identifier of the TWAN from the blacklist.

Optionally, the first indication information is an overload indication or an access delay indication.

Optionally, if the first indication information is the access delay indication, the UE 13 further includes a sending unit 133, further configured to send an access request message to the TWAN after waiting for a preset period of time.

Optionally, the sending unit 133 is further configured to send a network status query message to the third-party server, where the network status query message is used to determine whether the PGW is overloaded.

This embodiment of the present invention provides the user equipment UE. The UE receives the first message sent by the third-party server, where the first message includes the identifier of the trusted WLAN network TWAN, and the first indication information that is used to represent that the packet data network gateway PGW is overloaded. If the UE has added the identifier of the TWAN to the blacklist, the UE deletes the identifier of the TWAN from the blacklist. User plane data is transmitted between the third-party server and the UE, and no lower-layer signaling needs to be enhanced for the UE, thereby resolving a problem that UE wrongly adds, to a blacklist, an SSID of a TWAN to which the UE fails to access because a PGW is overloaded.

Figure 14:
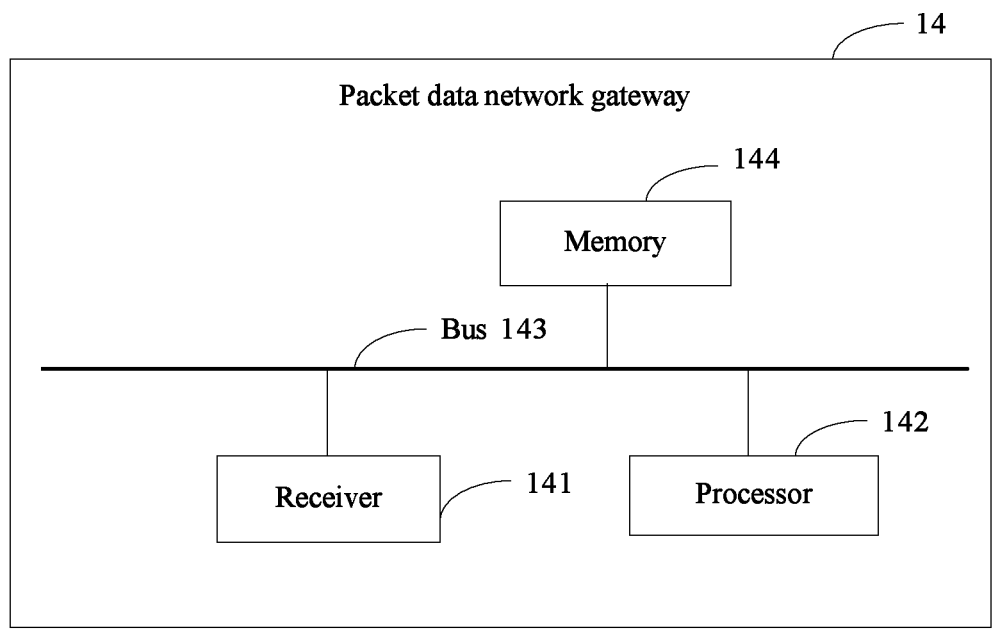
FIG. 14 is a schematic structural diagram of a packet data network gateway according to still another embodiment of the present invention.

Still another embodiment of the present invention provides a packet data network gateway PGW 14. As shown in FIG. 14, the PGW 14 includes a receiver 141, a processor 142, a bus 143, and a memory 144. The memory 144 is configured to store an instruction and data. The receiver 141 executes the instruction to receive an access request message of user equipment UE that is sent by a trusted WLAN network TWAN. The processor 142 executes the instruction to instruct, if the PGW is overloaded, a third-party server to send a first message to the UE. The first message includes an identifier of the TWAN, and first indication information that is used to represent that the PGW is overloaded.

In this embodiment of the present invention, optionally, the first message is used to instruct the UE not to add the identifier of the TWAN to a blacklist.

In this embodiment of the present invention, optionally, the instructing, by the processor 142 if the PGW is overloaded, a third-party server to send a first message to the UE includes:

sending a second message to the third-party server by using a service capability exposure function SCEF, so that the third-party server sends the first message to the UE according to the second message, where the second message includes an identifier of the UE, the identifier of the TWAN, and second indication information that is used to represent that the PGW is overloaded; or sending a second message to the third-party server by using a policy and charging rules function PCRF and an SCEF, so that the third-party server sends the first message to the UE according to the second message, where the second message includes an identifier of the UE, the identifier of the TWAN, and second indication information that is used to represent that the PGW is overloaded.

In this embodiment of the present invention, optionally, the first indication information is an overload indication or an access delay indication, and the second indication information is the overload indication or the access delay indication.

This embodiment of the present invention provides the packet data network gateway PGW. The PGW receives the access request message of the user equipment UE that is sent by the trusted WLAN network TWAN. If the PGW is overloaded, the PGW instructs the third-party server to send the first message to the UE. The first message includes the identifier of the TWAN, and the first indication information that is used to represent that the PGW is overloaded. For example, the first message is used to instruct the UE not to add the identifier of the TWAN to the blacklist. In this way, user plane data is transmitted between the third-party server and the UE, and no lower-layer signaling needs to be enhanced for the UE, thereby resolving a problem that UE wrongly adds, to a blacklist, an SSID of a TWAN to which the UE fails to access because a PGW is overloaded.

Figure 15:
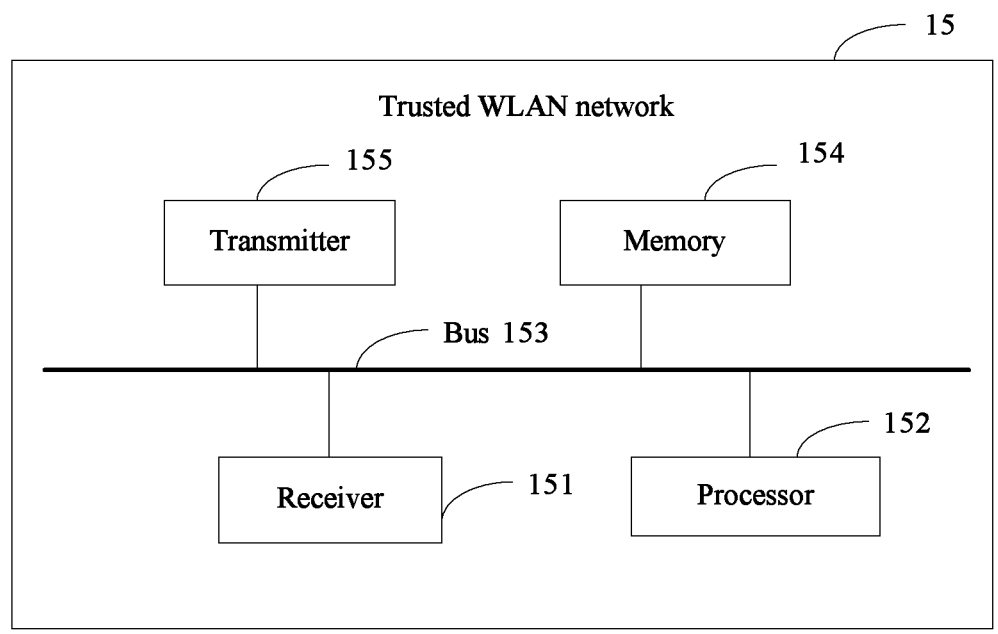
FIG. 15 is a schematic structural diagram of a trusted WLAN network according to still another embodiment of the present invention.

Still another embodiment of the present invention provides a trusted WLAN network TWAN 15. As shown in FIG. 15, the TWAN 15 includes: a receiver 151, a processor 152, a bus 153, a memory 154, and a transmitter 155. The memory 154 is configured to store an instruction and data. The transmitter 155 executes the instruction to send an access rejection message to user equipment UE according to an overload indication sent by a packet data network gateway PGW. The processor 152 executes the instruction to instruct a third-party server to send a first message to the UE. The first message includes an identifier of the TWAN, and first indication information that is used to represent that the PGW is overloaded.

In this embodiment of the present invention, optionally, the first message is used to instruct the UE not to add the identifier of the TWAN to a blacklist.

In this embodiment of the present invention, optionally, the executing, by the processor 152, the instruction to instruct a third-party server to send a first message to the UE includes:

sending a second message to the third-party server by using a service capability exposure function SCEF, so that the third-party server sends the first message to the UE according to the second message, where the second message includes an identifier of the UE, the identifier of the TWAN, and second indication information that is used to represent that the PGW is overloaded.

In this embodiment of the present invention, optionally, the first indication information is an overload indication or an access delay indication, and the second indication information is the overload indication or the access delay indication.

In this embodiment of the present invention, optionally, the receiver 151 executes the instruction to receive an overload monitoring subscription request sent by an SCEF, where the overload monitoring subscription request is used to subscribe to overload information of the PGW from the TWAN, and the overload monitoring subscription request includes an ID of the SCEF.

The transmitter 155 executes the instruction to further send an overload monitoring subscription response to the SCEF.

This embodiment of the present invention provides the trusted WLAN network TWAN. The TWAN sends the access rejection message to the user equipment UE according to the overload indication sent by the packet data network gateway PGW. After the TWAN sends the access rejection message to the UE, the TWAN instructs the third-party server to send the first message to the UE, where the first message includes the identifier of the TWAN, and the first indication information that is used to represent that the PGW is overloaded. For example, the first indication information is used to instruct the UE not to add the identifier of the TWAN to the blacklist. In this way, user plane data is transmitted between the third-party server and the UE, and no lower-layer signaling needs to be enhanced for the UE, thereby resolving a problem that UE wrongly adds, to a blacklist, an SSID of a TWAN to which the UE fails to access because a PGW is overloaded.

Figure 16:
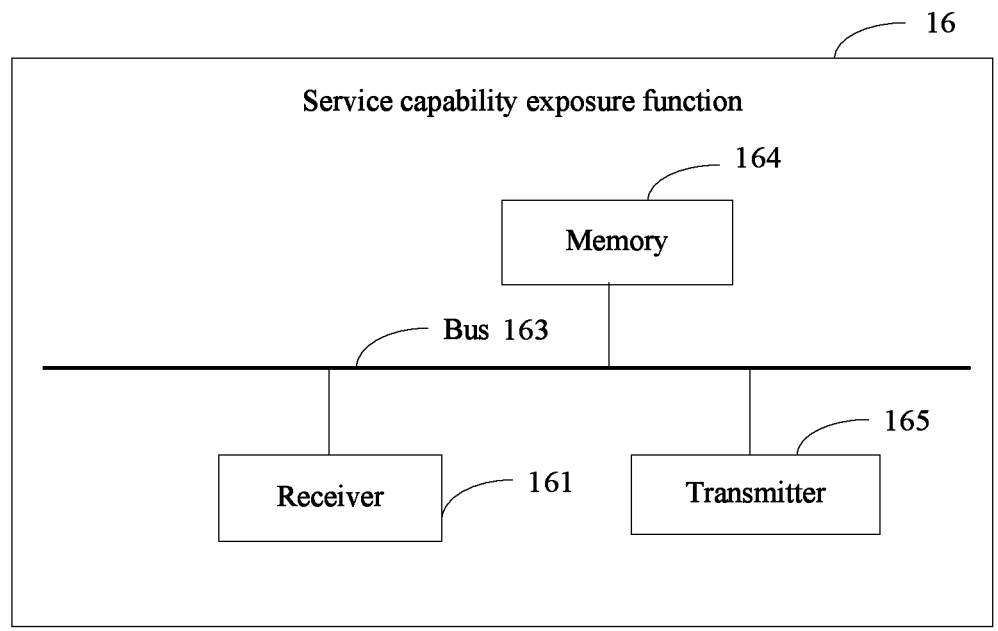
FIG. 16 is a schematic structural diagram of a service capability exposure function according to still another embodiment of the present invention.

Still another embodiment of the present invention provides a service capability exposure function SCEF 16. As shown in FIG. 16, the SCEF 16 includes: a receiver 161, a bus 163, a memory 164, and a transmitter 165. The memory 164 is configured to store an instruction and data. The receiver 161 executes the instruction to receive a first message sent by a network device. The first message includes an identifier of user equipment UE, an identifier of a trusted WLAN network TWAN, and first indication information that is used to represent that a packet data network gateway PGW is overloaded. The transmitter 165 executes the instruction to instruct, according to the first message, a third-party server to send a second message to the UE. The second message includes the identifier of the trusted WLAN network TWAN, and second indication information that is used to represent that the packet data network gateway PGW is overloaded.

In this embodiment of the present invention, optionally, the second message is used to instruct the UE not to add the identifier of the TWAN to a blacklist.

In this embodiment of the present invention, optionally, the network device is the TWAN, the PGW, or a policy and charging rules function PCRF.

The first indication information is an overload indication or an access delay indication, and the second indication information is the overload indication or the access delay indication.

In this embodiment of the present invention, optionally, the transmitter 165 executes the instruction to further send an overload monitoring subscription request to the TWAN, where the overload monitoring subscription request is used to subscribe to overload information of the PGW from the TWAN, and the overload monitoring subscription request includes an ID of the SCEF.

The receiver 161 executes the instruction to further receive an overload monitoring subscription response sent by the TWAN.

In this embodiment of the present invention, optionally, the receiver 161 executes the instruction to further receive an overload monitoring subscription request sent by the third-party server, to subscribe to overload information of the PGW from the SCEF, where the overload monitoring subscription request includes an identifier of the third-party server and a PGW overload monitoring request.

This embodiment of the present invention provides the service capability exposure function SCEF. The SCEF receives the first message sent by the network device, where the first message includes the identifier of the user equipment UE, the identifier of the trusted WLAN network TWAN, and the first indication information that is used to represent that the packet data network gateway PGW is overloaded. The SCEF sends the second message to the UE by using the third-party server, where the second message includes the identifier of the trusted WLAN network TWAN, and the second indication information that is used to represent that the packet data network gateway PGW is overloaded. For example, the second message is used to instruct the UE not to add the identifier of the TWAN to the blacklist. User plane data is transmitted between the third-party server and the UE, and no lower-layer signaling needs to be enhanced for the UE, thereby resolving a problem that UE wrongly adds, to a blacklist, an SSID of a TWAN to which the UE fails to access because a PGW is overloaded.

Figure 17:
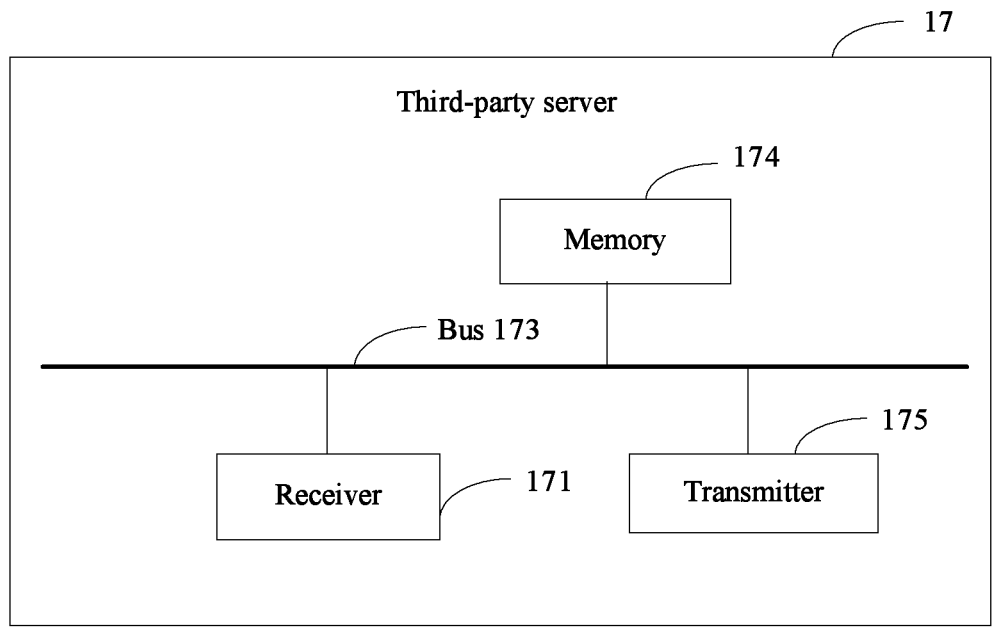
FIG. 17 is a schematic structural diagram of a third-party server according to still another embodiment of the present invention.

Still another embodiment of the present invention provides a third-party server 17. As shown in FIG. 17, the third-party server 17 includes: a receiver 171, a bus 173, a memory 174, and a transmitter 175. The memory 174 is configured to store an instruction and data. The receiver 171 executes the instruction to receive, after the third-party server establishes a connection to user equipment UE, a first message sent by a service capability exposure function SCEF. The first message includes an identifier of the UE, an identifier of a trusted WLAN network TWAN, and first indication information that is used to represent that a packet data network gateway PGW is overloaded. The transmitter 175 executes the instruction to send a second message to the UE. The second message includes the identifier of the TWAN, and second indication information that is used to represent that the PGW is overloaded.

In this embodiment of the present invention, optionally, the second message is used to instruct the UE not to add the identifier of the TWAN to a blacklist.

In this embodiment of the present invention, optionally, the first indication information is an overload indication or an access delay indication, and the second indication information is the overload indication or the access delay indication.

In this embodiment of the present invention, optionally, the receiver 171 executes the instruction to further receive a network status query message sent by the UE, where the network status query message is used to determine whether the PGW is overloaded.

In this embodiment of the present invention, optionally, the transmitter 175 executes the instruction to further send an overload monitoring subscription request to the SCEF, where the overload monitoring subscription request is used to subscribe to overload information of the PGW from the SCEF, and the overload monitoring subscription request includes an identifier of the third-party server and a PGW overload monitoring request.

This embodiment of the present invention provides the third-party server. After the third-party server establishes a connection to the user equipment UE, the third-party server receives the first message sent by the service capability exposure function SCEF, where the first message includes the identifier of the UE, the identifier of the trusted WLAN network TWAN, and the first indication information that is used to represent that the packet data network gateway PGW is overloaded. The third-party server sends the second message to the UE, where the second message includes the identifier of the TWAN, and the second indication information that is used to represent that the PGW is overloaded. For example, the second message may be used to instruct the UE not to add the identifier of the TWAN to the blacklist. User plane data is transmitted between the third-party server and the UE, and no lower-layer signaling needs to be enhanced for the UE, thereby resolving a problem that UE wrongly adds, to a blacklist, an S SID of a TWAN to which the UE fails to access because a PGW is overloaded.

Figure 18:
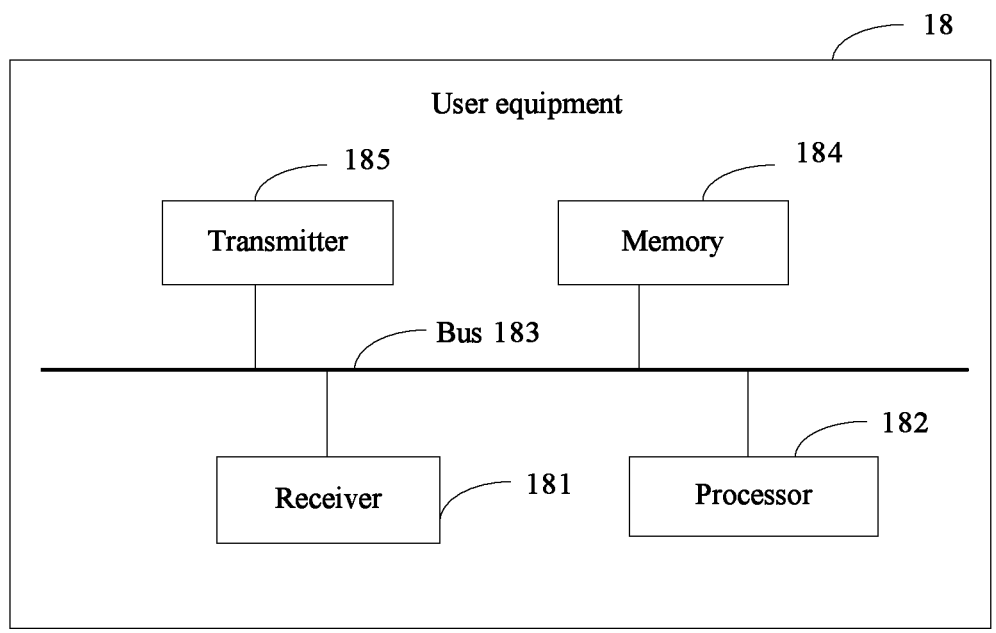
FIG. 18 is a schematic structural diagram of user equipment according to still another embodiment of the present invention.

Still another embodiment of the present invention provides user equipment UE 18. As shown in FIG. 18, the user equipment UE 18 includes: a receiver 181, a processor 182, a bus 183, a memory 184, and a transmitter 185. The memory 184 is configured to store an instruction and data. The receiver 181 executes the instruction to receive a first message sent by a third-party server. The first message includes an identifier of a trusted WLAN network TWAN, and first indication information that is used to represent that a packet data network gateway PGW is overloaded. The processor 182 executes the instruction to delete, if the UE has added the identifier of the TWAN to a blacklist, the identifier of the TWAN from the blacklist.

In this embodiment of the present invention, optionally, the first indication information is an overload indication or an access delay indication.

In this embodiment of the present invention, optionally, if the first indication information is the access delay indication, the transmitter 185 executes the instruction to send an access request message to the TWAN after waiting for a preset period of time.

In this embodiment of the present invention, optionally, the transmitter 185 executes the instruction to further send a network status query message to the third-party server, where the network status query message is used to determine whether the PGW is overloaded.

This embodiment of the present invention provides the user equipment UE. The UE receives the first message sent by the third-party server, where the first message includes the identifier of the trusted WLAN network TWAN, and the first indication information that is used to represent that the packet data network gateway PGW is overloaded. If the UE has added the identifier of the TWAN to the blacklist, the UE deletes the identifier of the TWAN from the blacklist. User plane data is transmitted between the third-party server and the UE, and no lower-layer signaling needs to be enhanced for the UE, thereby resolving a problem that UE wrongly adds, to a blacklist, an SSID of a TWAN to which the UE fails to access because a PGW is overloaded.

In the several embodiments provided in this application, it should be understood that the disclosed device and method may be implemented in other manners. For example, the described device embodiment is merely example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

In addition, functional units in the devices and systems in the embodiments of the present invention may be integrated into one processing unit, or each of the units may exist alone physically, or two or more units are integrated into one unit. The units may be implemented in a form of hardware, or may be implemented in a form of hardware in addition to a software functional unit.

All or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A network status information transfer method, comprising:
   receiving, by a user equipment (UE), a first message transmitted by a third-party server to the UE, wherein the first message comprises an identifier associated with a trusted wireless local area networks (WLAN) network (TWAN) and first indication information indicating that a packet data network gateway (PGW) is overloaded; and
   if the UE has added the identifier associated with the TWAN to a blacklist because the UE has failed to access the TWAN before receiving the first message from the third-party server, deleting, by the UE, the identifier associated with the TWAN from the blacklist in response to receiving the first message from the third-party server.

2. The method according to claim 1, wherein the first indication information is an overload indication or an access delay indication.

3. The method according to claim 1, wherein before the receiving, by the UE, a first message transmitted by a third-party server to the UE, the method further comprises:
   transmitting, by the UE, a network status query message to the third-party server, wherein the network status query message is used to determine whether the PGW is overloaded.

4. The method according to claim 2, wherein before the receiving, by the UE, a first message transmitted by the third-party server to the UE, the method further comprises:
   transmitting, by the UE, a network status query message to the third-party server, wherein the network status query message is used to determine whether the PGW is overloaded.

5. A device, comprising:
   at least one processor; and
   a non-transitory computer-readable storage medium coupled to the at least one processor and storing programming instructions for execution by the at least one processor, wherein the programming instructions instruct the at least one processor to:
      determine that access to a trusted wireless local area networks (WLAN) network (TWAN) by a user equipment (UE) is rejected because a packet data network gateway (PGW) is overloaded; and
      if access to the TWAN by the UE is rejected because the PGW is overloaded, instruct a third-party server to transmit a first message to the UE, wherein the first message comprises an identifier associated with the TWAN and first indication information indicating that the PGW is overloaded, and wherein the first message is used to instruct the UE not to add the identifier associated with the TWAN to a blacklist.

6. The device according to claim 5, wherein the device is the PGW, the TWAN, or a policy and charging rules function (PCRF).

7. The device according to claim 6, further comprising a transmitter configured to:
   transmit a second message to the third-party server using a service capability exposure function (SCEF), wherein the second message instructs the third-party server to transmit the first message to the UE, and wherein the second message comprises an identifier associated with the UE, the identifier associated with the TWAN, and second indication information indicating that the PGW is overloaded.

8. The device according to claim 7, wherein the first indication information is an overload indication or an access delay indication, and the second indication information is the overload indication or the access delay indication.

9. An apparatus, comprising:
   a receiver configured to receive a first message transmitted by a third-party server, wherein the first message comprises an identifier associated with a trusted wireless local area networks (WLAN) network (TWAN) and first indication information indicating that a packet data network gateway (PGW) is overloaded;
   at least one processor; and
   a non-transitory computer-readable storage medium coupled to the at least one processor and storing programming instructions for execution by the at least one processor, wherein the programming instructions instruct the at least one processor to:
      if the UE has added the identifier associated with the TWAN to a blacklist because the UE has failed to access the TWAN before receiving the first message from the third-party server, delete the identifier associated with the TWAN from the blacklist in response to receiving the first message from the third-party server.

10. The apparatus according to claim 9, wherein the first indication information is an overload indication or an access delay indication.

11. The apparatus according to claim 9, further comprising a transmitter configured to transmit a network status query message to the third-party server, wherein the network status query message is used to determine whether the PGW is overloaded.

12. The apparatus according to claim 10, further comprising a transmitter configured to transmit a network status query message to the third-party server, wherein the network status query message is used to determine whether the PGW is overloaded.

* * * * *

UNITED STATES PATENT AND TRADEMARK OFFICE
CERTIFICATE OF CORRECTION

PATENT NO. : 10,470,105 B2
APPLICATION NO. : 15/835008
DATED : November 5, 2019
INVENTOR(S) : Hualin Zhu, Youyang Yu and Huan Li It is certified that error appears in the above-identified patent and that said Letters Patent is hereby corrected as shown below:

On the Title Page

Item [56], Column 2, Line 1, delete "V132.0" and insert -- V13.2.0 --, therefor.

Signed and Sealed this
Seventh Day of January, 2020

Andrei Iancu
*Director of the United States Patent and Trademark Office*